United States Patent [19]

Thornthwaite et al.

[11] Patent Number: 4,798,189

[45] Date of Patent: Jan. 17, 1989

[54] FUEL INJECTION PUMP

[75] Inventors: Ian R. Thornthwaite, Gillingham; Robert S. Bond, Maidstone, both of England

[73] Assignee: Lucas Industries Public Limited Company, Birmingham, England

[21] Appl. No.: 86,893

[22] Filed: Aug. 18, 1987

[30] Foreign Application Priority Data

Sep. 9, 1986 [GB] United Kingdom ............... 8621668

[51] Int. Cl.⁴ .......................................... F02M 39/00
[52] U.S. Cl. ............................. 123/502; 123/179 L; 123/450; 417/462
[58] Field of Search .................. 123/502, 449, 179 L, 123/450, 500–501; 417/462

[56] References Cited

U.S. PATENT DOCUMENTS

| 3,897,764 | 8/1975 | Bakti | 123/502 |
| 4,329,961 | 5/1982 | Johnston | 123/502 |
| 4,345,566 | 8/1982 | Hammock | 123/502 |
| 4,501,252 | 2/1985 | Stumpp | 123/502 |
| 4,526,154 | 7/1985 | Di Demenico | 123/502 |
| 4,535,745 | 8/1985 | Rocanierga | 123/502 |
| 4,557,240 | 10/1985 | Sakoranaka | 123/502 |

FOREIGN PATENT DOCUMENTS

| 2345724 | 3/1974 | Fed. Rep. of Germany | 123/502 |
| 60830 | 5/1981 | Japan | 123/502 |

Primary Examiner—Carl Stuart Miller
Attorney, Agent, or Firm—Balogh, Osann, Kramer, Dvorak, Genova & Traub

[57] ABSTRACT

A fuel injection pump includes a piston movable by fluid pressure to vary the setting of a cam ring of the apparatus in order to alter the timing of fuel delivery. A piston member is provided for the purpose of setting the piston in a particular position when the associated engine is cold and acceleration is required. The piston member is angularly movable and port means is provided in the piston member and its cylinder so that in one angular position the opposite ends of the piston member are subject to the same fluid pressure and in other angular positions one end of the cylinder contains fluid at a higher pressure to cause the piston member to move from the one end of the cylinder to set the piston in the desired position.

9 Claims, 2 Drawing Sheets

FUEL INJECTION PUMP

This invention relates to a liquid fuel injection pump for supplying fuel to an internal combustion engine and of the kind comprising a pumping plunger located in a bore, cam means and cam follower means, a drive shaft coupled to one of said means for driving the cam means and cam follower means relative to each other to impart inward movement to the plunger, and further means for effecting limited movement of the other of said means about the axis of rotation of the drive shaft.

Figure 1:
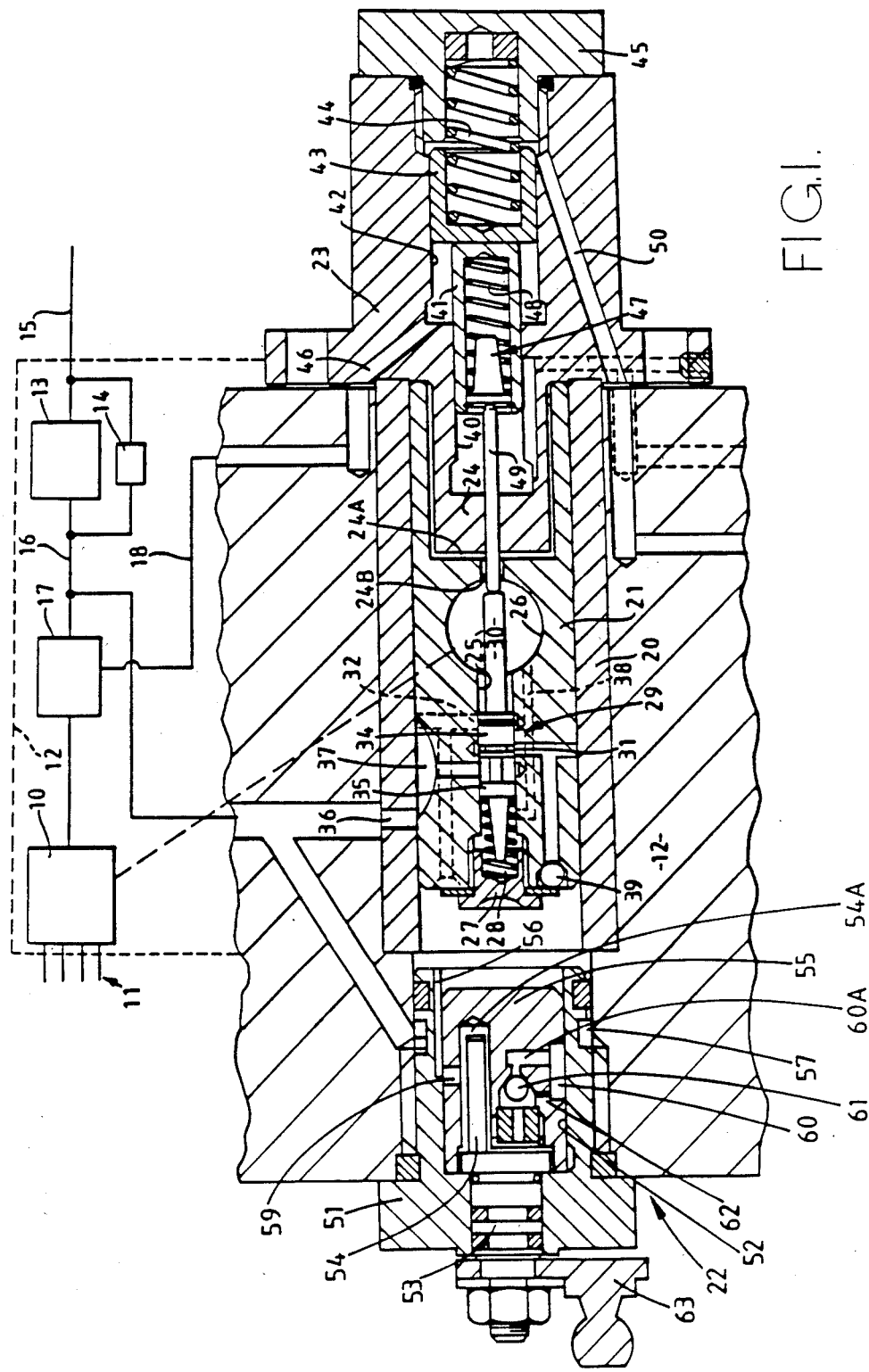

An example of such a pump is shown in FIG. 1 of U.S. Pat. No. 4,520,782 being a rotary distributor type fuel injection pump in which the drive shaft is coupled to a rotary distributor member which carries the pump plunger or plungers in a transverse bore. The cam follower means is rotatable with the distributor member and the cam means comprising an annular cam ring having cam lobes on its internal peripheral surface. The aforesaid further means comprises a piston which is coupled to the cam ring in such a manner that the cam ring can be moved angularly about the axis of rotation of the distributor member and drive shaft to enable the timing of fuel delivery by the pump to be varied.

Such pumps also incorporate a low pressure pump which besides serving as a source of fuel under pressure for application to the piston, also serve to supply fuel to the bore containing the plungers.

It is known to control the output pressure of the low pressure pump so that it varies in accordance with the speed and to utilise this pressure to determine the position of the piston in such a way that as the speed of the associated engine increases, the piston is moved in a direction to advance the timing of delivery of fuel to the associated engine. The position of the piston may also be made responsive to the amount of fuel which is being supplied to the engine in such a way that as the amount of fuel which is supplied to the engine is increased, the piston is moved in the opposite direction.

It has been found that for so-called direct injection compression ignition engines that is to say where the fuel is delivered directly into the engine cylinders, it is desirable to advance the timing of fuel delivery when the engine is cold in order to obtain satisfactory acceleration of the engine from low speeds.

The object of the invention is to provide a pump of the kind specified in a simple and convenient form.

According to the invention a pump of the kind specified comprises a piston member slidable within a cylinder, means for moving the piston member angularly within the cylinder and port means in the piston member and cylinder whereby in one angular position of the piston member in the cylinder the fluid pressures at each end of the piston member are equal and in another angular position the pressure in one end of the cylinder will be higher than that in the other end of the cylinder to cause said piston member to move away from said one end of the cylinder, the movement of said piston member being transmitted to the other of said means.

Figure 2:
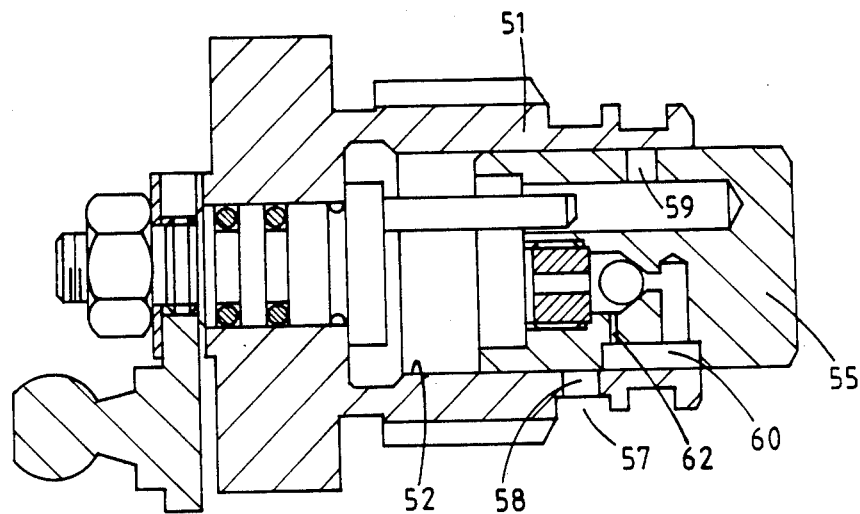

An example of a fuel injection pump in accordance with the invention will now be described with reference to the accompanying drawings in which:

FIG. 1 shows a part of the pump in block form, the remaining part of the pump being shown in sectional side elevation, and FIG. 2 is a view of part of the pump seen in FIG. 1 in an alternative position.

Referring to FIG. 1 of the drawings the fuel injection pump is of the rotary distributor type in which a distributor member is journalled within a body part and is provided with a transversely extending bore which contains a pair of pumping plungers. The plungers are arranged to be moved inwardly to displace fuel from the bore by cam lobes formed on the internal peripheral surface of an annular cam ring, the distributor member being coupled to a drive shaft which in use is driven in timed relationship with an associated engine. Fuel displaced by the inward movement of the plungers is delivered to a plurality of outlet ports in turn and fuel is supplied to the bore during the filling periods thereof. This portion of the pump, which can be regarded as a high pressure pump, is indicated at 10 in the accompanying drawing with the outlets being indicated at 11. The body part of the pump is indicated at 12 and located within the body part is a low pressure pump 13 which draws fuel through an inlet 15 and supplies fuel through an outlet 16 which is connected to the inlet of the high pressure pump 10 by way of a fuel control device indicated at 17. The outlet pressure of the low pressure pump 13 is controlled by a relief valve 14 so that the outlet pressure varies in accordance with the speed at which the pump is driven.

The fuel control device 17 may take the form of a throttle or it may be some other more complex form of device but whichever form it takes, it is arranged to produce in a pipeline 18, fuel at a pressure which varies inversely with the amount of fuel which is being supplied to the associated engine that is to say the pressure increases towards the outlet pressure of the low pressure pump as the amount of fuel which is supplied to the associated engine decreases.

Turning now to the sectioned portion of the drawing the body part 12 houses a sleeve 20 in which is slidably mounted a piston 21. The piston 21 is mechanically coupled to the aforesaid cam ring in known manner and one end of the cylinder defined by the sleeve is closed by a closure assembly 22 to be described, whilst the other end of the cylinder is closed by an end closure 23 which is detachably secured to the body part 12 and which has a cylindrical portion 24 of lesser diameter than the cylinder, projecting into the cylinder. Moreover, the piston 21 is recessed and the cylindrical portion 24 extends into the recess to define with the piston a space 24A.

Formed in the piston is a bore 25 which extends from a central opening 26 in which is located a peg (not shown) coupled to the cam ring, to the end of the piston nearer to the closure 22. This end of the bore is closed by a screwed plug 27 which serves as an abutment for one end of a light coiled compression spring 28 the other end of which is engaged with a valve member generally indicated at 29, slidable within the bore 25. The valve member is provided with an extension 30 which extends partly across the opening 26 for a purpose to be described.

The valve member 29 controls the admission of fuel under pressure into the end of the cylinder defined between the piston and the closure assembly 22 and it also controls the escape of fluid from the cylinder. For this purpose a pair of ports 31, 32 open into the bore 25 at axially spaced positions. Both ports are connected by drillings respectively with the end of the cylinder adjacent the closure assembly 22 and the valve member is provided with a land 34 which in the equilibrium position as shown, covers the ports 31 and 32. The valve member defines a further land 35 which is spaced from the land 34 to define a groove to which fuel under pressure from the outlet 16 of the low pressure pump 13 is constantly supplied, this being achieved by a port 36 in the sleeve and a co-operating groove 37 formed in the piston. The end of the valve member from which extends the extension 30 is exposed to the pressure within the body part 12 and it is arranged that the opposite end of the valve member is also subjected to this pressure by providing a passage 38 in the piston and which extends to the opening 26. By this arrangement the ends of the valve member are exposed to the same low pressure and the presented faces of the lands 34, 35 are exposed to the same higher pressure so that the valve member can be regarded for practical purposes, as being pressure balanced.

With the arrangement as described, movement of the valve member towards the left as seen in the drawings, will expose the port 32 to permit fuel to escape from the cylinder thereby allowing movement of the piston towards the left as seen in the drawing until an equilibrium position is established with the ports 31 and 32 being covered by the land 34. If the valve member is moved towards the right then the port 31 is uncovered to the groove in the valve member and fuel can flow into the one end of the cylinder to move the piston towards the right until the equilibrium position is again established. It will thus be seen that the piston will follow the movement of the valve member. The piston 21 being connected to the cam ring is subject to the reaction forces generated by the action of the followers with the cam lobes and the normal cam reaction when the followers engage the leading flanks of the cam lobes will be to urge the piston towards the left and it is this reaction which causes movement of the piston when the valve member is moved towards the left. The cam reaction would normally displace the piston to the left relative to the valve member and such movement would tend to open the port 31 so that pressurised fuel in the end of the cylinder could be forced back towards the outlet of the low pressure pump. Such flow of fuel is prevented by the action of a ball check valve indicated at 39. When the followers ride over the cam lobes the reaction force is in the opposite direction tending to move the piston to the right. The result is that the movement of the piston needs to be controlled in a manner to be described.

Formed in the end closure 23 is a stepped bore in the narrower and inner part 40 of which is slidable a first control piston 41. The piston 41 extends into a wider part 42 of the bore in which is located a second control piston 43 and the latter is biased in a direction towards the piston 21 by the action of a coiled compression spring 44 which bears against a closure plug 45. The inner portion of the part 42 of the bore is connected by way of a passage 46, with the aforesaid pipeline 18 and the inner portion of the part 40 of the bore is connected to the outlet 16 of the low pressure pump.

The piston 41 is of cup-shaped form having its open end directed towards the piston 21 and located within the piston 41 is an abutment member 47 which is biased by a spring 48 located within the piston into engagement with a circlip or similar retaining member in the open end of the piston. The abutment 47 is engaged by a pin 49 which extends through a drilling in the cylindrical portion 24 and into engagement with the extension 30 of the valve member 29. The portion of the pin 49 which passes through the piston 21 does so with a clearance 24B which forms a restricted flow path into the space 24A between the extension 30 and the piston 21. The restricted flow of fuel from the space 24A through the clearance 24B acts to damp the movement of the piston 21 after the followers have ridden over the cam lobes. Finally the space between the piston 43 and the plug 45 communicates by way of a passage 50 with the interior of the body part.

In operation, and considering firstly the action of the piston 41, this is subject to the outlet pressure of the low pressure pump 13 and moves under the action of this pressure against the action of the spring 44. Such movement allows the spring 28 to urge the valve member towards the right and as previously described, this will permit fuel to flow into the cylinder to cause movement of the piston 21 towards the right. It should be noted that in the drawing the piston is already in its extreme right hand position. As the output pressure of the low pressure pump falls, the piston 41 will move to the left under the action of the spring 44 and this will cause displacement of the valve member towards the left thereby allowing the piston 21 to move towards the left. The setting of the piston 21 therefore varies in accordance with the outlet pressure of the low pressure pump which as previously stated, varies in accordance with the speed.

The timing of fuel delivery in a distributor pump of the type described varies with the amount of fuel which is being supplied to the associated engine and as the quantity of fuel delivered reduces, the timing of the start of fuel delivery becomes later. It is therefore desirable, to be able to move the cam ring to at least maintain the timing of delivery of fuel and this is achieved by use of the piston 43 which is subjected to the pressure in the pipe line 18. This pressure increases as the quantity of fuel decreases and the practical effect is that with a reduction in the quantity of fuel, the piston 43 will move along with the piston 41 against the action of the spring to move the cam ring in the direction to advance the timing of fuel delivery.

The movement of the piston 21 is damped by the fact that fuel has to flow into and out of the damping chamber defined by the space 24A between the piston and the cylindrical portion 24 through the aforesaid clearance 24B. However, when the pump is assembled there will be little if any fuel in the damping chamber or in the remaining passages so that the damping action will not be provided and the movement of the piston 21 will not be controlled. The purpose of the spring 48 which normally takes no part in the operation of the pump, is to allow movement of the abutment in this situation thereby to minimise the stress applied to the thin rod 49.

The closure assembly 22 besides serving to close the end of the cylinder defined by the sleeve 20, also provides a timing adjustment for use when the associated engine is cold. The closure assembly comprises a housing 51 which is in screw thread engagement with the body part 12 and which defines a cylinder 52 into which extends a rotary shaft 53 which is angularly adjustable from exterior of the body part of the pump. The shaft 53 carries an eccentrically disposed pin 54 which is located with clearance within a complementary recess 54A formed in a piston member 55. Formed in the internal wall of the cylinder defined by the housing is an axially extending groove 56 which is in constant communication with the cylinder defined by the sleeve 20. Moreover, defined about the housing is a groove 57 which as will be seen in FIG. 1, communicates with the outlet 16 of the low pressure pump 13. As seen in FIG. 2, the groove 57 is in communication with a port 58 which extends into the cylinder 52.

The piston member 55 is provided with a port 59 for registration in one angular position of the piston member 55, with the groove 56. The port 59 communicates by way of the recess provided for the pin 54, with the end of the cylinder 52 remote from the piston 21. In addition, the piston is provided with a longitudinal groove 60 which by way of a passage 60A including a ball check valve 61 which is bypassed by a restricted orifice 62, also communicates with the aforesaid end of the cylinder 52. In the position shown in FIG. 1, the piston member is angularly positioned such that the port 59 is in register with the groove 56 and the groove 60 is out of register with the port 58. Both ends of the piston member 55 are therefore subject to the same fuel pressure and the piston member will tend to assume the position in which it is shown in FIG. 1. If the shaft 53 is moved angularly, relative angular movement between the piston member 55 and the housing 51 takes place and this is illustrated in FIG. 2 in which for the purpose of illustration and contrary to what happens in practice, the housing 51 is shown in an alternative position. In the alternative position the port 59 is out of register with the groove 56 and the groove 60 is brought into register with the port 58. This allows fuel at the outlet pressure of the low pressure pump, to flow into the end of the cylinder 52 remote from the piston 21. As a result the piston member moves towards the right as seen in FIG. 2 and this movement continues until the groove 60 moves out of register with the port 58. It is arranged such that if further movement of the piston number 55 takes place then the groove 60 will uncover to the cylinder defined by the sleeve 20. In the advanced position of the piston member as shown in FIG. 2 the piston member can engage the end closure 27 on the piston 21 and will move the piston 21 in a direction to advance the timing of fuel delivery.

The movement of the shaft 53 is effected by means of a lever 63 which may be connected to an engine temperature responsive device such that the piston member 55 is moved to the advanced position as shown in FIG. 2, when the associated engine is cold. Alternatively the lever 63 may be moved manually.

When the piston member 55 effects movement of the piston 21 relative movement of the piston and valve member will take place and the piston will be moved against the action of the spring 28 until the extended end of the valve member engages the end closure 27. If the movement of the piston 21 is greater than the permitted relative movement of the piston 21 and the valve member, the spring 48 will be compressed. When the valve member is moved as described, the port 32 is open to the low pressure and as a result the piston movement will not be controlled. It is for this reason that the piston member 55 incorporates the check valve 61 so that cam reaction which will tend to cause movement of the piston 21 and the piston member 55 towards the left, will be resisted. The restricted orifice 62 is provided for the purpose of allowing the piston member 55 to return to the position in which it is shown in FIG. 1, when a cold engine is stopped and then restarted. If the orifice were not provided the actual starting of the engine would take place with the timing of fuel delivery too far advanced.

We claim:

1. A liquid fuel injection pumping apparatus for supplying fuel to an internal combustion engine comprising a pumping plunger located in a bore, cam means and cam follower means, a drive shaft coupled to one of said means for driving the cam means and cam follower means relative to each other to impart inward movement to the plunger in the bore, a piston member slidable within a cylinder, means for moving the piston member angularly within the cylinder and port means in the piston member and cylinder whereby in one angular position of the piston member in the cylinder the fluid pressures applied to each end of the piston member are equal and in an angular position the pressure applied to one end of the piston member will be higher than the fluid pressure applied to the other end of the piston member to cause said piston member to move away from one end of the cylinder, and means transmitting the movement of said piston member to the other of said means.

2. An apparatus according to claim 1 including a low pressure pump for supplying fuel to said bore, the low pressure pump having an outlet, said port means when said piston member is in said another angular position, connecting said outlet with said one end of the cylinder.

3. The apparatus according to claim 2 in which said port means include a port in the wall of said cylinder, a passage connecting said outlet with said port, a groove in the wall of said piston, the groove registering with said port in said another angular position of the piston member, and passage means connecting said groove with said one end of the cylinder, said passage means including a ball check valve and restricted orifice bypassing said check valve.

4. An apparatus according to claim 3 in which said groove after a predetermined movement of the piston member away from said one end of the cylinder moves out of register with said port, thereby to limit the movement of the piston member.

5. An apparatus according to claim 4 in which in said one angular position of the piston member said port means further includes a connecting path between the opposite ends of the cylinder, said connecting path being open only when the piston is in said one angular position.

6. An apparatus according to claim 5 in which said connecting path includes a groove in the wall of the cylinder, said groove extending from said other end of the cylinder towards said one end of the cylinder, a recess in said piston member, the recess opening to said one end of the cylinder and a port in the piston member, said port communicating with said recess and being positioned to register with the groove in the wall of the cylinder when said piston member is moved to said one angular position.

7. An apparatus according to claim 6 including a shaft extending into said one end of the cylinder and a pin eccentrically disposed on said shaft, said pin extending with clearance within said recess whereby angular movement of the shaft will impart angular movement to the piston member.

8. An apparatus according to claim 7 in which said shaft is coupled to a temperature responsive device.

9. An apparatus according to claim 1 including a piston slidable in a further cylinder, means coupling said piston to said cam means, said piston member when in said another angular position engaging said piston to displace said piston axially within said further cylinder.

* * * * *